United States Patent Office 3,023,607
Patented Mar. 6, 1962

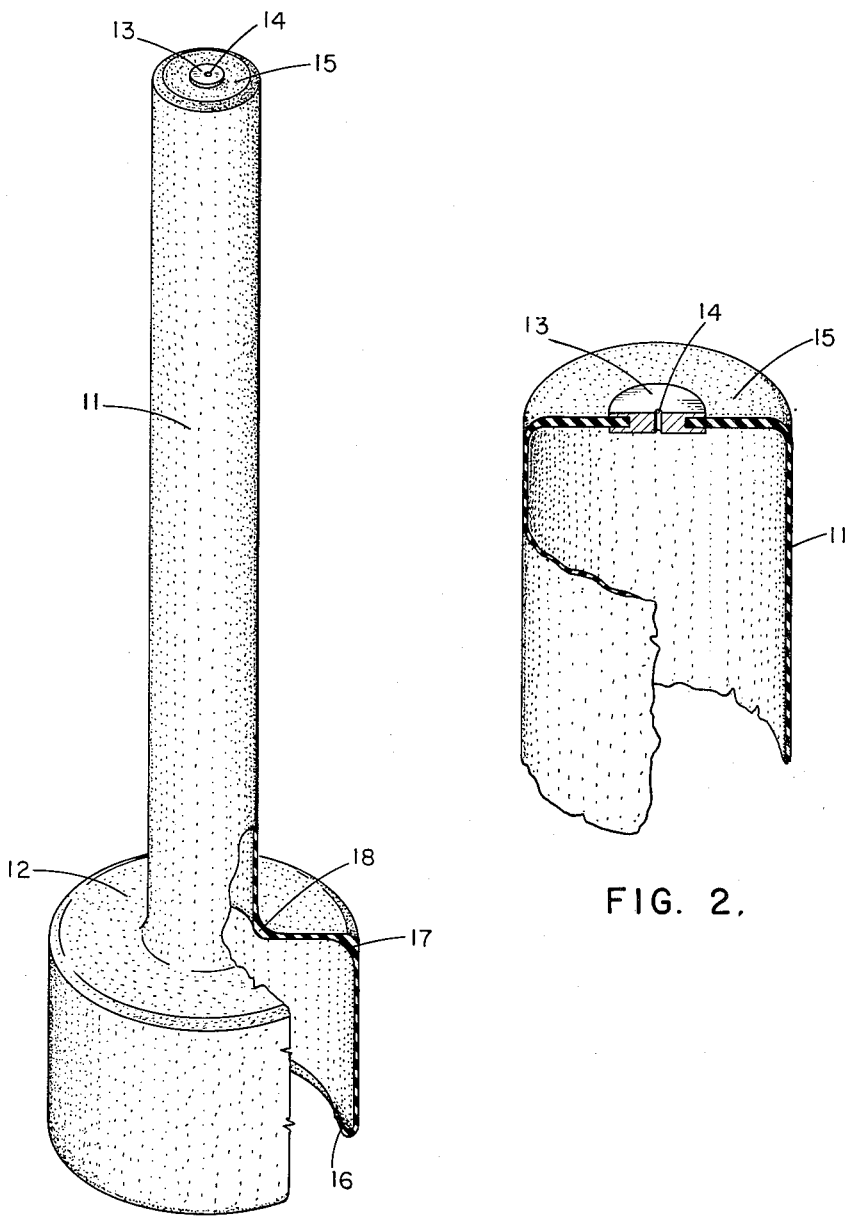

3,023,607
DEVICE FOR DETECTING LEAKS
Adrian D. Bolch, Jr., Houston, and Newton O. Felps, Baytown, Tex., assignors, by mesne assignments, to Esso Research and Engineering Company, Elizabeth, N.J., a corporation of Delaware
Filed July 8, 1959, Ser. No. 825,782
8 Claims. (Cl. 73—46)

The present invention is directed to a device for detecting leaks. More particularly, the invention is concerned with apparatus for determining the flow of fluid from a pipe or the like. In its more specific aspects, the invention is concerned with a tubular leak detector.

The present invention may be briefly described as a leak detector which comprises an elongated expandable elastic tubular member having a closed free end, the closed free end being formed with an orifice of predetermined size. Attached to the end of the elastic member opposite the free end is a base member having a diameter greater than that of the elastic member and is adapted to be sealingly connected to a discharge pipe from which gasiform fluid is flowing or can flow. The elastic member assumes a substantially extended position on filling with a gasiform fluid and on passage of the gasiform fluid under pressure through the elastic member.

The leak detector may suitably be formed such that the elastic member has a corrosion-resistant plate which may be a metal plate such as stainless steel, copper alloys, steel alloys, nickel and nickel alloys, and the like.

The base member of the device of the present invention may also suitably be formed of the same elastic material from which the expandable elastic member is formed. However, the base member may be formed of a nonresilient material so long as it may be attached to the elastic member and so long as it may be sealingly connected to a discharge pipe from which gasiform fluid is flowed.

The leak detector may suitably be formed of plastic or rubber compounds. Illustrative of the plastics which may be used may be mentioned polyvinyl, polypropylene, polyethylene, and polyester. Rubber compounds which may be used include butyl, Buna N, silicon, natural, and the like.

The present invention will be further illustrated by reference to the drawing in which:

FIG. 1 is an isometric view in partial section of the device of the present invention in operative position, and FIG. 2 is an enlarged fragmentary sectional view of a portion of the device of FIG. 1.

Referring now to the drawing and particularly to FIGS. 1 and 2, numeral 11 designates an elongated expandable elastic member which is attached to a base member 12. The elongated elastic member 11 has a metal plate 13 provided with an orifice 14 of a predetermined size arranged in the closed end 15 of the elongated member 11. The plate 13 may be suitably constructed of stainless steel or may be constructed of other materials which are not subject to corrosion. For example, the plate 13 may be constructed of another plastic such as nylon, phenolic resin, polypropylene, polyvinyl, and the like.

The base member 12 has an inwardly turned flange 16 which allows a sealing connection to be made to the end of a pipe from which gas is flowed. The base member 12 may be suitably reinforced as shown at 17 and 18 to withstand hard usage.

Referring now to FIG. 2 particularly, it will be seen that the orifice 14 is arranged in the plate 13 in the free end 15 of the elongated member 11.

The present invention operates as follows: For example, the base member 12 will be placed over a discharge pipe from a safety valve and sealed thereto by elastic bands, garter springs, and the like from which leakage may be suffered due to improper feeding or seating of the safety valve. If gas is leaking from the safety valve, the expandable elastic member 11 assumes an extended position from a relaxed position and is easy to determine by visual inspection whether or not gas is leaking from the safety valve or from the pipe from which gas is expected to be flowing.

The orifice may be of a predetermined size and may be selected such that ½ pound of pressure in the elastic member 11 may cause it to assume an extended or vertical position and release leaking gas at a predetermined rate.

Devices of the nature described in FIGS. 1 and 2 have been constructed. For example, the devices of FIGS. 1 and 2 comprising an expandable elastic member approximately 2 feet in height and 2 inches in diameter with a base member of about 3 inches in height and approximately 6.625 inches in diameter was constructed of polyvinyl plastic. The orifice opening was approximately 0.031 inch and the device was constructed to fit over a safety valve discharge pipe. The orifice opening may vary over a range depending on the pressure of the flowing fluid which extends the leak detector and the rate at which gasiform fluid is released through the orifice. On placing the device on the safety valve discharge from which leakage was suspected and sealingly attaching it thereto, the expandable elastic member assumes a vertical position allowing the leak to be detected from the ground, for example, when the safety valve is on the top of a vessel some 40 or more feet in height.

The expandable elastic member may be constructed to have a thickness of about 0.006 inch or a thickness of about 0.012 inch. The thickness of the expandable elastic member may vary from about 0.003 inch to about 0.05 inch.

While the device will operate with approximately a half pound pressure, it may operate at a higher pressure up to about 5 pounds per square inch gauge at which time the base member 12 would be blown from the safety valve or from the pipe from which gas is being emitted.

The present invention is of considerable value and utility in that it allows visual detection of leaking safety relief valves and pipes from a distance. It reduces atmospheric corrosion on the inside diameter of the discharge pipe and from the safety relief valve. Furthermore, it can be adapted to fit various discharge pipe sizes and it is of very low cost. Furthermore and additionally, the amount of allowable leakage which may be tolerated may be changed by varying the size of the orifice. Another advantage of the present invention is that it requires only a very low pressure to cause it to assume an extended or vertical position and therefore prevents excessive back-pressure build-up on safety relief valves.

The present invention is of considerable utility and advantage.

The nature and objects of the present invention having been completely described and illustrated, what we wish to claim as new and useful and secure by Letters Patent is:

1. A leak detector which comprises an elongated expandable elastic member having a closed free end, a corrosion-resistant plate in said closed end provided with an open orifice of predetermined size, and a base member attached to the end of said elastic member opposite to the free end having a diameter greater than that of the elastic member and adapted to be sealingly connected to a discharge pipe from which gasiform fluid is flowable, said elastic member assuming a substantially extended position on passage of said gasiform fluid under sufficient pressure through said elastic member.

2. A leak detector which comprises an elongated expandable elastic member having a closed free end, a corrosion-resistant metal plate in said closed end provided with an open orifice of predetermined size, and a base member attached to the end of said elastic member opposite to the free end having a diameter greater than that of the elastic member and adapted to be sealingly connected to a discharge pipe from which gasiform fluid is flowable, said elastic member assuming a substantially extended position on passage of said gasiform fluid under sufficient pressure through said elastic member.

3. A leak detector which comprises an elongated expandable elastic member having a closed free end, a corrosion-resistant plate in said closed end provided with an open orifice of predetermined size, and an elastic base member attached to the end of said elastic member opposite to the free end having a diameter greater than that of the elastic member and adapted to be sealingly connected to a discharge pipe from which gasiform fluid is flowable, said elastic member assuming a substantially extended position on passage of said gasiform fluid under sufficient pressure through said elastic member.

4. A leak detector which comprises an elongated expandable elastic member having a closed free end, a corrosion-resistant metal plate in said closed end provided with an open orifice of predetermined size, and an elastic base member attached to the end of said elastic member opposite to the free end having a diameter greater than that of the elastic member and adapted to be sealingly connected to a discharge pipe from which gasiform fluid is flowable, said elastic member assuming a substantially extended position on passage of said gasiform fluid under sufficient pressure through said elastic member.

5. A leak detector which comprises an elongated expandable elastic plastic member having a closed free end, a corrosion-resistant plate in said closed end provided with an open orifice of predetermined size, and a base member attached to the end of said elastic member opposite to the free end having a diameter greater than that of the elastic member and adapted to be sealingly connected to a discharge pipe from which gasiform fluid is flowable, said elastic member assuming a substantially extended position on passage of said gasiform fluid under sufficient pressure through said elastic member.

6. A leak detector in accordance with claim 5 in which the plastic is polyvinyl.

7. A leak detector which comprises an elongated expandable elastic member having a closed free end, said closed end being formed with an open orifice of predetermined size, and a base member attached to the end of said elastic member opposite to the free end having a diameter greater than that of the elastic member and adapted to be sealingly connected to a discharge pipe from which gasiform fluid is flowable, said elastic member assuming a substantially extended position on passage of said gasiform fluid under sufficient pressure through said elastic member.

8. A leak detector in accordance with claim 7 in which the base member is formed to provide an inwardly turned flange.

References Cited in the file of this patent

UNITED STATES PATENTS

| | | |
|---|---|---|
| 1,270,073 | Thiem | June 18, 1918 |
| 1,327,251 | Overmyer | Jan. 6, 1920 |
| 1,384,888 | Carlisle | July 19, 1921 |
| 1,586,127 | Storm | May 25, 1926 |
| 1,987,486 | Michaelis | Jan. 8, 1935 |